(12) United States Patent
Yoo et al.

(10) Patent No.: US 12,340,569 B2
(45) Date of Patent: Jun. 24, 2025

(54) METHOD AND APPARATUS FOR TRAINING NEURAL NETWORK MODELS TO INCREASE PERFORMANCE OF THE NEURAL NETWORK MODELS

(71) Applicant: Samsung Electronics Co., Ltd., Suwon-si (KR)

(72) Inventors: Jaewook Yoo, Suwon-si (KR); Dokwan Oh, Hwaseong-si (KR); Dasol Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 568 days.

(21) Appl. No.: 17/696,354

(22) Filed: Mar. 16, 2022

(65) Prior Publication Data

US 2022/0383623 A1 Dec. 1, 2022

(30) Foreign Application Priority Data

May 18, 2021 (KR) .......... 10-2021-0064266
Jul. 13, 2021 (KR) .......... 10-2021-0091360

(51) Int. Cl.
*G06V 10/776* (2022.01)
*G06V 10/764* (2022.01)
*G06V 10/77* (2022.01)
*G06V 10/82* (2022.01)

(52) U.S. Cl.
CPC .......... *G06V 10/776* (2022.01); *G06V 10/764* (2022.01); *G06V 10/7715* (2022.01); *G06V 10/82* (2022.01)

(58) Field of Classification Search
CPC ........ G06V 10/82; G06N 3/082; G06N 3/084; G06N 3/0985; G06N 3/0464
See application file for complete search history.

(56) References Cited

U.S. PATENT DOCUMENTS

| | | |
|---|---|---|
| 10,713,816 B2 | 7/2020 | Hu et al. |
| 10,871,536 B2 | 12/2020 | Golden et al. |
| 2019/0050982 A1 | 2/2019 | Song et al. |

(Continued)

FOREIGN PATENT DOCUMENTS

| | | |
|---|---|---|
| CN | 107480707 A | 12/2017 |
| KR | 10-2020-0073445 A | 6/2020 |
| WO | WO 2020/164271 A1 | 8/2020 |

OTHER PUBLICATIONS

Carreira, Joao, et al. "Semantic Segmentation with Second-Order Pooling." *European conference on computer vision. Springer, Berlin, Heidelberg*, 2012 (14 pages in English).

(Continued)

*Primary Examiner* — Raphael Schwartz
(74) *Attorney, Agent, or Firm* — NSIP Law

(57) ABSTRACT

Disclosed are a method and apparatus for training a neural network model to increase performance of the neural network model, the method including receiving input data and target data, pooling, by a neural network model, on a feature map extracted from the input data based on a probability for each of classes of the feature map, generating output data by inputting the input data to a neural network model, determining a loss based on comparing the output data and the target data and an auxiliary loss of the pooling, and training the neural network model based on the loss.

17 Claims, 10 Drawing Sheets

(56) References Cited

U.S. PATENT DOCUMENTS

2019/0244358 A1    8/2019  Shi et al.
2019/0362200 A1*  11/2019  Jang .................... G06V 10/82

OTHER PUBLICATIONS

Sun, Manli, et al. "Learning Pooling for Convolutional Neural Network." *Neurocomputing vol. 224*, 2017 pp. 96-104.

Tao, Andrew, et al. "Hierarchical multi-scale attention for semantic segmentation." arXiv preprint arXiv:2005.10821, May 22, 2020, (11 pages in English).

Wang, Shuyang, et al. "Attention guided encoder-decoder network with multi-scale context aggregation for land cover segmentation." IEEE Access 8 (Nov. 26, 2020): 215299-215309.

Niu, Ruigang, et al. "Hybrid multiple attention network for semantic segmentation in aerial images." IEEE Transactions on Geoscience and Remote Sensing 60 (2022): 1-18.

Extended European search report issued on Nov. 14, 2022, in counterpart European Patent Application No. 22171576.6 (9 pages in English).

\* cited by examiner

METHOD AND APPARATUS FOR TRAINING NEURAL NETWORK MODELS TO INCREASE PERFORMANCE OF THE NEURAL NETWORK MODELS

CROSS-REFERENCE TO RELATED APPLICATIONS

This application claims the benefit under 35 USC § 119(a) of Korean Patent Application No. 10-2021-0064266, filed on May 18, 2021, and Korean Patent Application No. 10-2021-0091360, filed on Jul. 13, 2021, in the Korean Intellectual Property Office, the entire disclosures of which are incorporated herein by reference for all purposes.

BACKGROUND

1. Field

The following description relates to a method and apparatus for training a neural network model to increase performance of the neural network using a probability for each of classes when performing pooling in the neural network model.

2. Description of Related Art

Recently, neural network models have been used in various fields including, for example, the fields of autonomous driving (AD), advanced driver assistance systems (ADAS), virtual reality (VR), and Internet of Things (IoT). For example, a neural network model may be used to recognize an object in an image.

A neural network model commonly used in image recognition is a convolutional neural network (CNN). The CNN may include a convolutional layer to perform a convolution operation and a pooling layer to perform pooling. The pooling layer may generate output data by resizing input data through sampling.

A conventional pooling method may use a representative value or a mean value, and thus a loss of input data may occur in the pooling process, which may degrade the performance of the neural network model. There is a need for a technology to prevent loss of input data in the pooling process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method of training a neural network model, the method including receiving input data and target data, pooling, by a neural network model, on a feature map extracted from the input data based on a probability for each of classes of the feature map, generating output data by inputting the input data to a neural network model, determining a loss based on comparing the output data and the target data and an auxiliary loss of the pooling, and training the neural network model based on the loss.

The auxiliary loss may include a loss determined based on a difference between the target data and the feature map pooled by the neural network model.

The neural network model may be configured to determine the probability for each of the classes based on a ratio of elements belonging to a class of the classes to elements comprised in a unit region of the feature map determined by a scale factor of the pooling.

The input data may include an image comprising objects, and pixels comprised in the image are classified into the classes corresponding to the objects.

The target data may include a distribution of probabilities of the classes of the input data, wherein the auxiliary loss comprises a loss calculated based on a distance between a distribution of probabilities of the classes of the input data comprised in the target data and a distribution of probabilities of the classes of the feature map.

In another general aspect, there is provided an apparatus for training a neural network model, the apparatus including a processor configured to receive input data and target data, perform pooling, by a neural network model, on a feature map extracted from the input data based on a probability for each of classes of the feature map, generate output data by inputting the input data to a neural network model, determine a loss based on comparing the output data and the target data and an auxiliary loss of the pooling, and train the neural network model based on the loss.

The auxiliary loss may include a loss determined based on a difference between the target data and the feature map pooled by the neural network model.

The neural network model may be configured to determine the probability for each of the classes based on a ratio of elements belonging to a class of the classes to elements comprised in a unit region of the feature map determined by a scale factor of the pooling.

The input data may include an image comprising objects, and pixels comprised in the image are classified into the classes corresponding to the objects.

The target data may include a distribution of probabilities of the classes of the input data, wherein the auxiliary loss may include a loss calculated based on a distance between a distribution of probabilities of the classes of the input data comprised in the target data and a distribution of probabilities of the classes of the feature map.

In another general aspect, there is provided a processor-implemented method of training a neural network model, the method including receiving input data and target data, extracting a feature map from the input data, performing pooling on the feature map based on a scale factor and a probability of classes of objects being in the feature map, generating output data by inputting the input data to a neural network model, determining a loss based on comparing the output data and the target data and an auxiliary loss of the pooling, and training the neural network model based on the loss.

A probability of a class of the classes of the objects being in the feature map may include determining a ratio of elements belonging to the class to all elements in a unit region of the feature map.

The target data may include a distribution of probabilities of each of the classes being present in each unit region of the input data, and the auxiliary loss may be based on a distance between the distribution of probabilities of the classes of the feature map and the distribution of the probabilities of classes of a corresponding region of the input data in the target data.

The target data may include a ground truth label, and the determining of the loss based on comparing the output data and the target data may include determining the loss based on comparing the output data and the ground truth label.

The method may include performing of the pooling on the target data to make a size of the target data equal to a size of the feature map, and the auxiliary loss may be based on a distance between the distribution of probabilities of the classes of the feature map and the distribution of probabilities of classes of the pooled target data.

Other features and aspects will be apparent from the following detailed description, the drawings, and the claims.

BRIEF DESCRIPTION OF THE DRAWINGS

FIGS. 3A through 3F illustrate examples of a pooling operation method.

Figure 1:
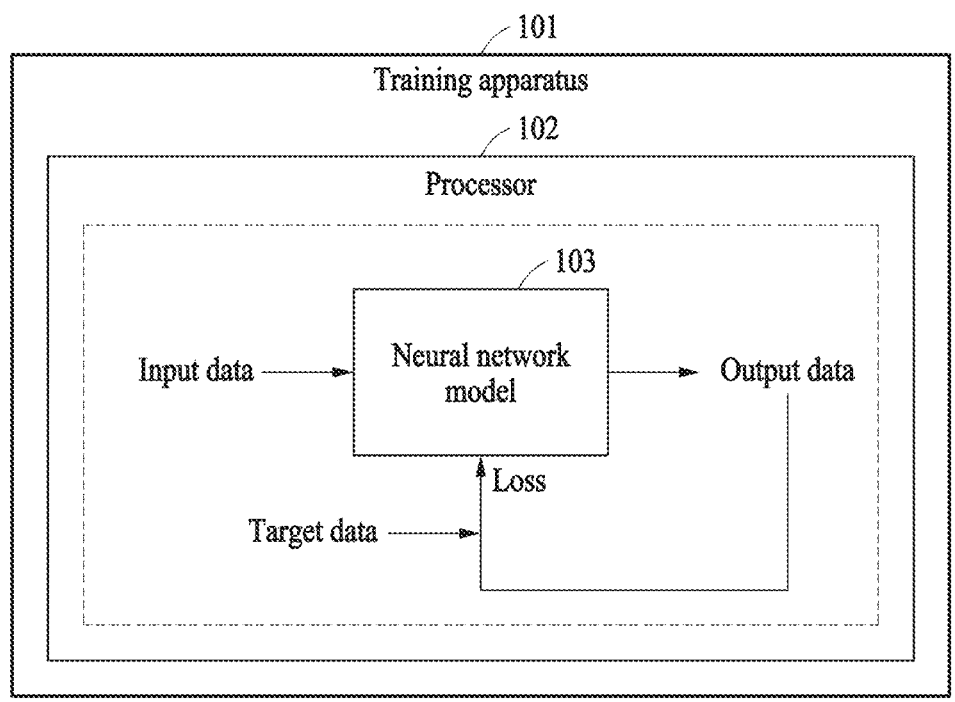
FIG. 1 illustrates an example of a training apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third", A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

The use of the term "may" herein with respect to an example or embodiment (e.g., as to what an example or embodiment may include or implement) means that at least one example or embodiment exists where such a feature is included or implemented, while all examples are not limited thereto.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of a training apparatus.

In an example, performance of a neural network model 103 may be improved using a probability for each class when pooling in training a neural network model 103 to minimize a loss that may occur from the pooling.

Referring to FIG. 1, a training apparatus 101 of the neural network model 103 may include a processor 102. The processor 102 may perform various training methods. The training apparatus 101 may include the neural network model 103 that generates output data from input data. All operations processed by the neural network model 103 may be performed by the processor 102.

The processor 102 may read/write neural network data, for example, text data, voice data, image data, feature map data, kernel data, etc., from/to a memory (not shown) and execute the neural network model 103 using the read/written data. When the neural network model 103 is executed, the processor 102 may repeatedly perform convolution operations between an input feature map and a kernel, in order to generate data with respect to an output feature map. Here, a number of operations of the convolution operation may be determined, depending on various factors, such as, for example, the number of channels of the input feature map, the number of channels of the kernel, a size of the input feature map, a size of the kernel, and a precision of a value. The neural network model 103 may be implemented as a complicated architecture, where the processor 102 performs the convolution operation with an operation count of up to hundreds of millions to tens of billions, and the frequency at which the processor 102 accesses the memory for the convolution operations rapidly increases.

The neural network model 103 included in the training apparatus 101 may include an input layer to receive the input data, a hidden layer to perform an operation on the input data, and an output layer to generate the output data. In an example, the neural network model 103 may be a convolutional neural network (CNN) model, but a type or structure of the neural network model 103 may not be limited thereto. Various training methods described herein may be applied to various types of neural network models that perform pooling.

The input data and the output data may be different based on a purpose of use of the neural network model 103. In an example, the input data may be an image, and the output data may be an object included in the image, but the input data may not be limited thereto, and the output data may be determined differently based on the purpose of the neural network model 103.

Referring to FIG. 1, target data may be a ground truth label when training the neural network model 103 through supervised learning. The neural network model 103 may be trained to generate, from the input data, output data that is the same as the target data. In an example, the processor 102 may determine a loss by comparing the target data and the output data and updating a parameter of the neural network model 103 to minimize the loss.

In this example, the neural network model 103 may include a plurality of operation blocks to extract a feature map from the input data and to perform pooling on the feature map. Here, pooling may refer to resizing the input data through sampling. Through pooling, a data loss may be minimized. The neural network model 103 trained according to example embodiments described herein may be used in various fields inference operations. The inference operation may include, for example, pattern recognition (e.g., image recognition, object detection, object recognition, facial identification, etc.), sequence recognition (e.g., speech, gesture, and written text recognition, machine translation, machine interpretation, machine transliteration etc.), control (e.g., vehicle control, process control, etc.), segmentation, depth estimation, recommendation services, decision making, medical diagnoses, financial applications, data mining, and the like.

Figure 2:
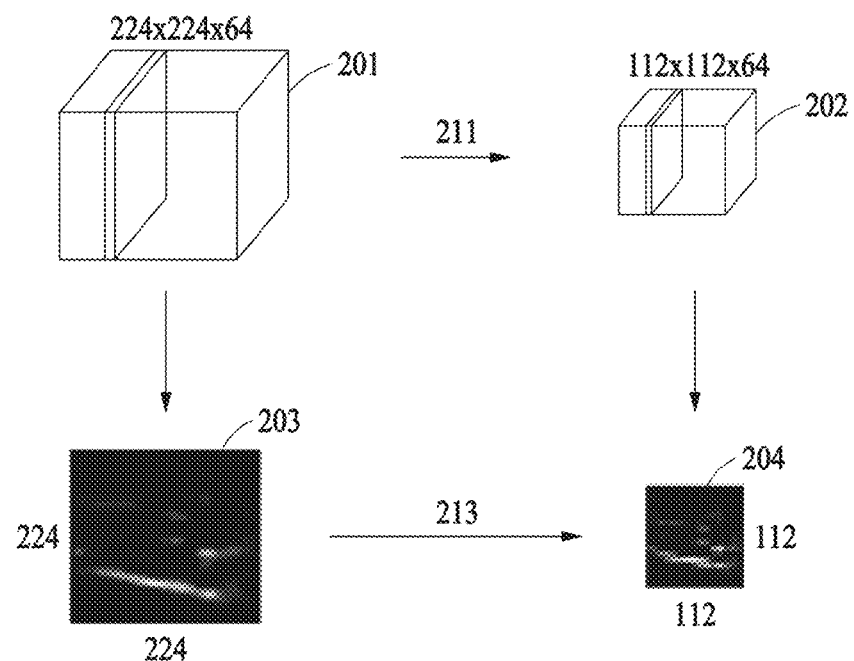
FIG. 2 illustrates an example of a pooling operation performed in a neural network model.

FIG. 2 illustrates an example of a pooling operation performed in a neural network model.

Pooling may refer to a process of reducing a size of data. For example, a pooling process in the neural network model may be a process to reduce a size of a feature map. Referring to FIG. 2, a size of a feature map 201 may be 224×224×64. The pooling may be performed on the feature map 201, as indicated by an arrow 211 in FIG. 2. A size of a pooled feature map 202 may be 112×112×64.

An image 203 corresponding to the feature map 201 may be downsampled, as indicated by an arrow 213 in FIG. 2. Referring to FIG. 2, when a size of the image 203 corresponding to the feature map 201 is 224×224 and a scale factor of the pooling is 2, a size of an image 204 that has been pooled may be 112×112.

FIGS. 3A through 3F illustrate examples of a pooling operation method.

Figure 3A:
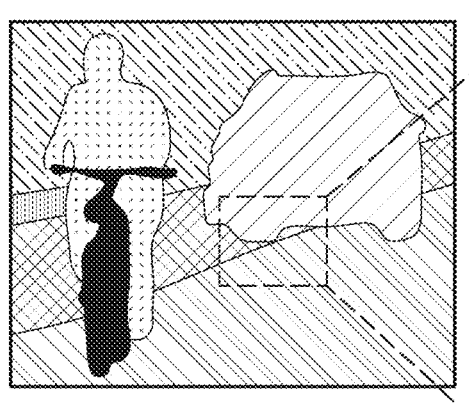

FIG. 3A illustrates input data that is an image including one or more objects. In an example, the input data may include an image including a plurality of objects, and pixels included in the image may be classified into classes corresponding to each of the plurality of objects. In an example, there may be twenty (20) classes for a cityscrapes dataset.

FIG. 3B illustrates a feature map generated from a region with input data. The feature map may include a plurality of unit regions. For example, the feature map may include 16 unit regions as illustrated in FIG. 3B. In an example, a unit region may indicate a region of pooling in a unit. The unit region may be determined by a scale factor of the pooling. When the scale factor of the pooling is 2, the feature map may be sampled by the pooling to ½ in each of a horizontal size and a vertical size.

Referring to FIG. 3B, a unit region may include a plurality of elements. Each of the elements may be classified into one class from among a plurality of classes. A unit region 301 may include elements belonging to classes 1 and 13, as illustrated in FIG. 3B. For example, an element may indicate one or more pixels, and each class may indicate an object. For example, in FIG. 3A, class 0 311 may indicate a road, class 1 312 may indicate a sidewalk, class 13 313 may indicate a vehicle, and class 19 314 may indicate a region that may be ignored. The ignorable region may be a region to be ignorable in an image processing process.

A neural network model may perform pooling (e.g., downsampling) in a unit region of a feature map. In an example, the neural network model may perform pooling on the feature map based on a probability for each of classes of the feature map. The pooling may be performed based on Equation 1 below.

$$Y'_{k(l,m)} = \frac{1}{s^2}\sum_{(i,j)}\mu_{i,j}, \text{ with } \mu_{i,j} = \begin{cases} 1, & \text{if } Y_{(i,j)} = k \\ 0, & \text{otherwise.} \end{cases} \quad \text{[Equation 1]}$$

Equation 1 may be used to perform pooling on a k class. In Equation 1, $Y'_{k(l,m)}$ denotes a value of an element of a pooled feature map. $Y_{(i,j)}$ denotes a class of the element of the feature map before the pooling. s denotes a scale factor. $\Sigma\mu$ denotes the number of elements of a class included in a unit region.

In an example, the neural network model may determine the probability for each of the classes based on a ratio of elements belonging to a class to elements included in the unit region. Referring to FIG. 3B, the unit region 301 may include four elements. Of the four elements, three elements may be in class 1 312 and one element may be in class 13 313. The ratio of the elements belonging to class 1 312 may be 0.75, and a ratio of the elements belonging to class 13 313 may be 0.25.

Figure 3C:
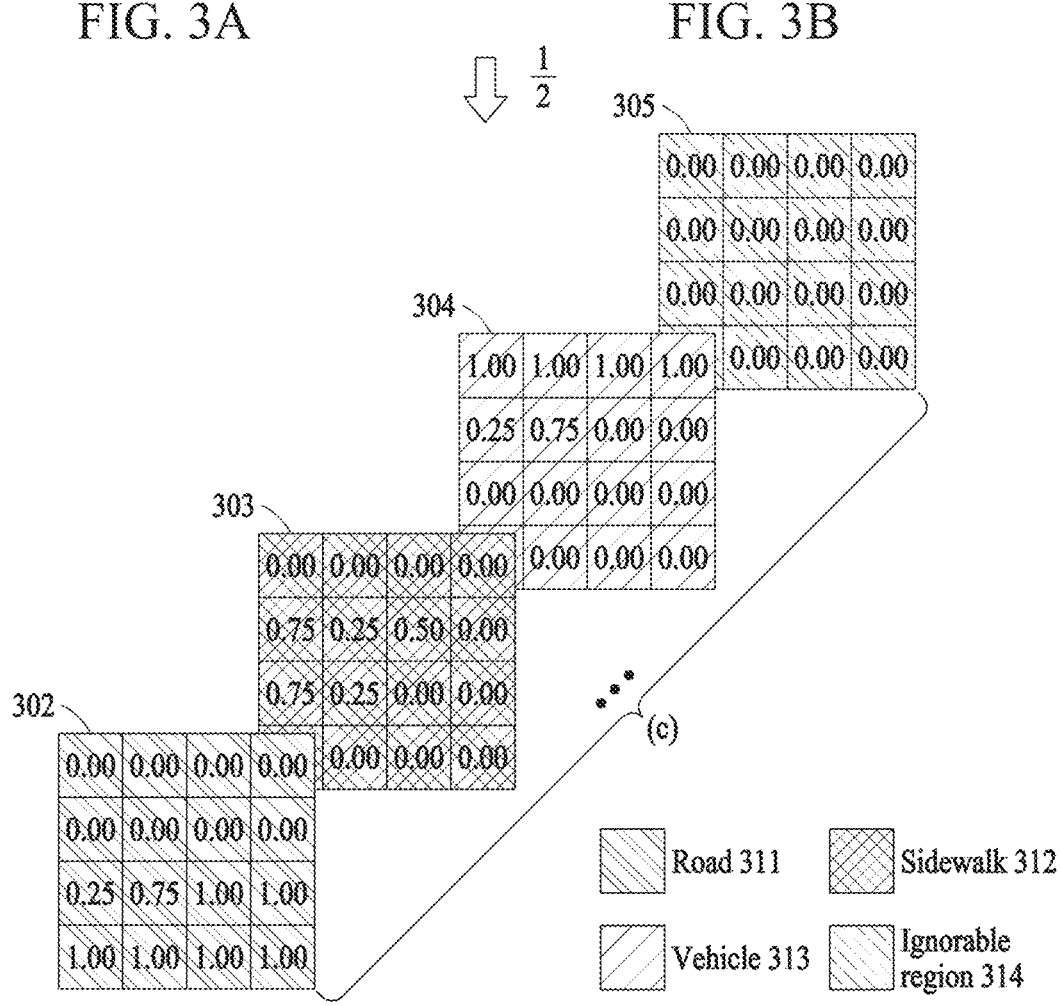

FIG. 3C illustrates a feature map pooled for each class. Referring to FIG. 3C, a scale factor of pooling may be set to 2. When a total of 20 classes are present, a channel of the feature map may be 1 in FIG. 3B, whereas channels of the feature maps may be 20 in FIG. 3C.

Referring to FIG. 3C, since no element belonging to class 0 311 is present in the unit region 301, a value corresponding to the unit region 301 in a feature map 302 pooled for class 0 311 may be 0. Since a ratio of elements belonging to class 1 312 in the unit region 301 is 0.75, a value corresponding to the unit region 301 in a feature map 303 pooled for class 1 312 may be 0.75. Since a ratio of elements belonging to class 13 313 in the unit region 301 is 0.25, a value corresponding to the unit region 301 in a feature map 304 pooled for class 13 313 may be 0.25.

The neural network model may perform pooling based on a ratio of elements of a class to all elements included in a unit region determined by a scale factor of the pooling. A channel of a pooled feature map may correspond to the number of classes included in the input data. Referring to FIGS. 3A-3C, when a scale factor is 2, a size of a pooled unit region may be determined to be $\frac{1}{2}^2$ of a size of the unit region before the pooling.

Figures 3D, 3E:
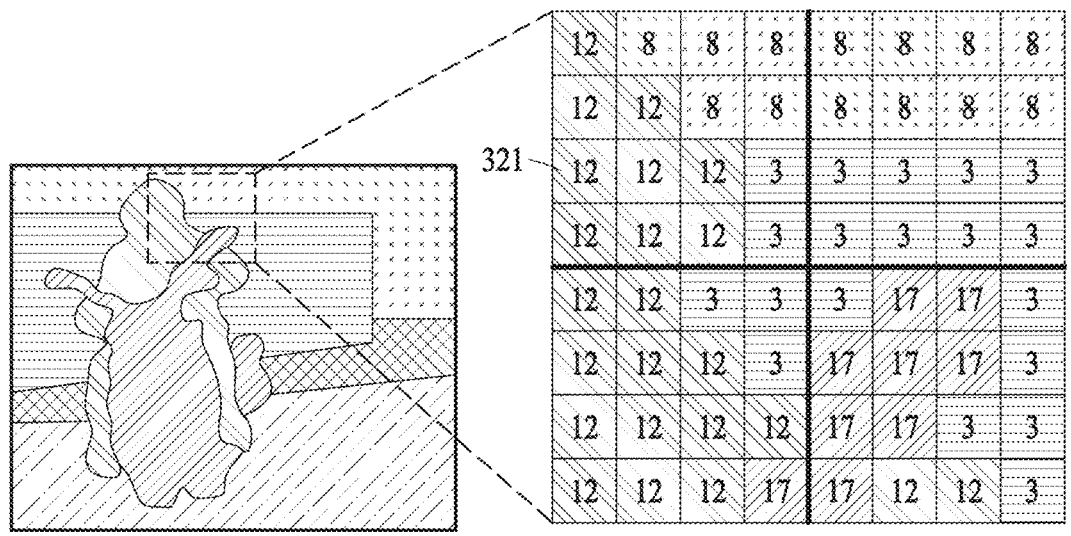

FIG. 3D illustrates input data that is an image including one or more objects. In an example, the input data may include an image including a plurality of objects, and pixels included in the image may be classified into classes corresponding to the plurality of objects.

FIG. 3E illustrates a feature map generated from a region with input data. The feature map may include a plurality of unit regions. For example, the feature map may include four unit regions as illustrated in FIG. 3E. In this example, a scale factor may be 4. Referring to FIGS. 3D-3E, each of a horizontal size and a vertical size of the feature map may be sampled by the pooling to ¼.

Referring to FIG. 3E, a unit region may include a plurality of elements. A unit region 321 in FIG. 3E may include elements of classes 12, 8, and 3. For example, class 12 may correspond to a human being, class 8 may correspond to a vegetation, class 3 may correspond to a wall, and class 17 may correspond to a motorcycle.

The neural network model may perform pooling (e.g., downsampling) on a unit region of a feature map. In an example, the neural network model may perform pooling on the feature map based on a probability for each of classes of the feature map. In this example, the neural network model may determine the probability for each of the classes based on a ratio of elements belonging to a class to elements included in the unit region.

Referring to FIG. 3E, the unit region 321 may include 16 elements. Of the 16 elements, nine elements may be in class 12, five elements may be in the class 8, and two elements may be in the class 3. The ratio of elements of class 12 may be 0.5625, and the ratio of elements of class 8 may be 0.3125.

Figure 3F:
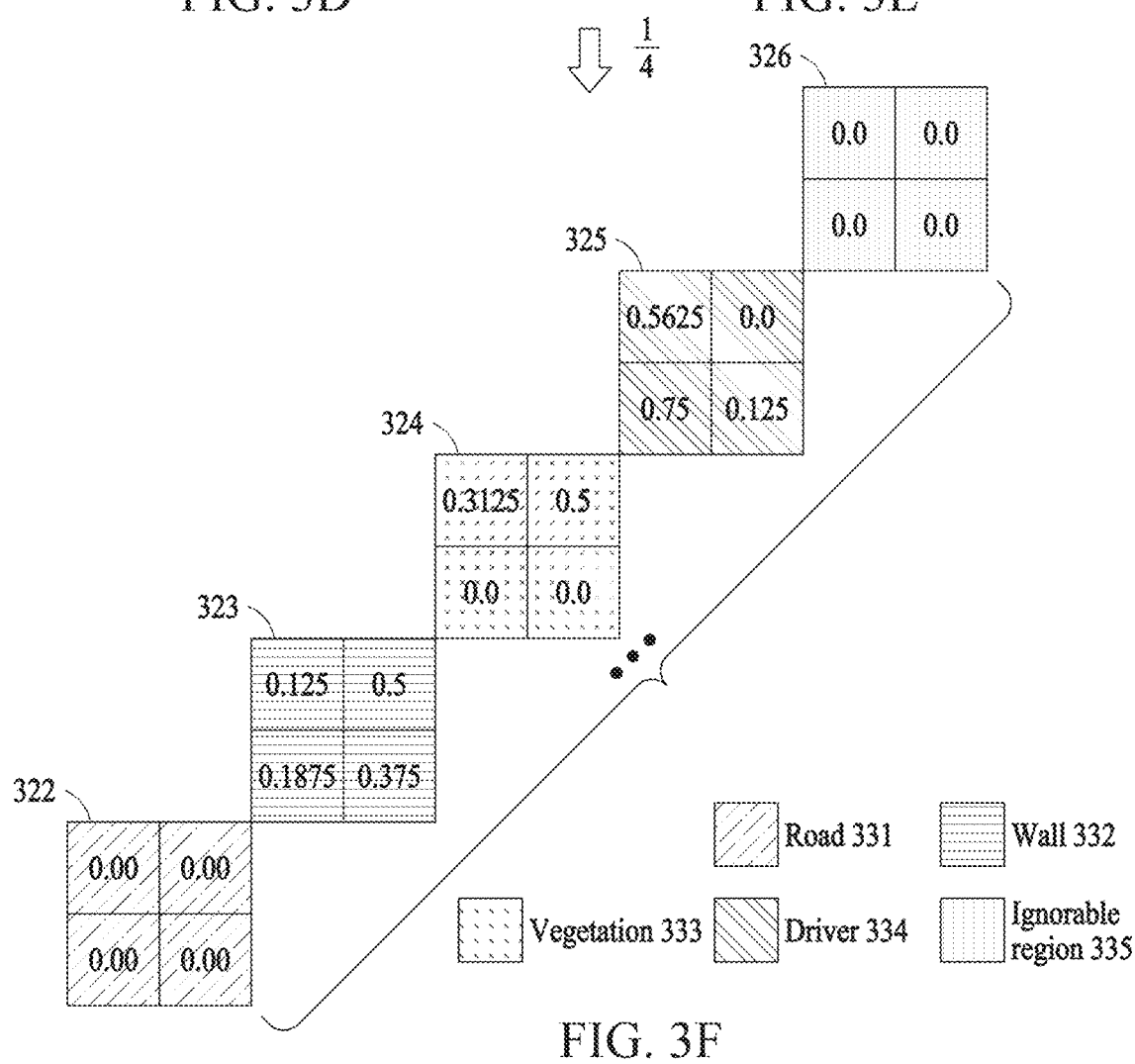

FIG. 3F may illustrate a feature map pooled for each class. Referring to FIG. 3F, a scale factor of pooling may be set to 4. When a total of 20 classes are present, a channel of a feature map may be 1 in FIG. 3E, whereas a channel of a feature map may be 20 in FIG. 3F.

Referring to FIG. 3F, since no element of class 0 331 is present in the unit region 321, a value corresponding to the unit region 321 in the pooled feature map 302 for class 0 331 may be 0.

Since a ratio of elements of class 12 334 in the unit region 321 is 0.5625, a value corresponding to the unit region 321 in a feature map 325 pooled for class 12 334 may be 0.5625.

Since a ratio of elements of class 8 333 in the unit region 321 is 0.3125, a value corresponding to the unit region 321 in a feature map 324 pooled for class 8 333 may be 0.3125.

Since a ratio of elements of class 3 332 to the unit region 321 is 0.125, a value corresponding to the unit region 321 in a feature map 323 pooled for class 3 332 may be 0.125. A channel of the pooled feature map may correspond to the number of classes included in the input data. Referring to FIG. 3B, when a scale factor is 4, a size of a pooled unit region may be ¼² of a size of the unit region before the pooling.

Figure 4:
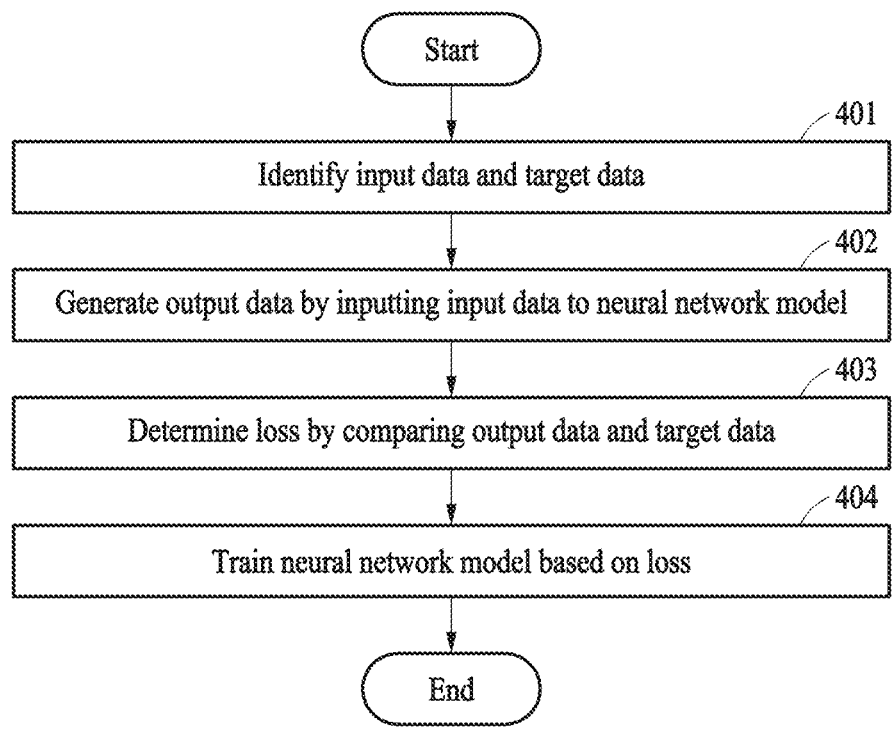
FIG. 4 illustrates an example of a method of training.

FIG. 4 illustrates an example of a method of training. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

In operation 401, a training apparatus may identify input data and target data. For example, the input data may be an image. The input data may include an image including a plurality of objects, and pixels included in the image may be classified into classes corresponding to each of the plurality of objects.

In operation 402, the training apparatus may generate output data by inputting the input data to a neural network model. For example, the neural network model may be a CNN model. In this example, the neural network model may include a plurality of operation blocks that extract a feature map from the input data and perform pooling on the feature map.

In operation 403, the training apparatus may determine a loss by comparing the output data and the target data. The target data may include a distribution of probabilities of the classes of the input data, in addition to a ground truth label. The distribution of the probabilities of the classes may be present in each unit region of the input data.

The loss may include a loss determined based on a difference between the target data and a feature map pooled by the neural network model, in addition to a difference between the output data and the target data. The loss determined based on the difference between the pooled feature map and the target data may be defined as an auxiliary loss.

In an example, the training apparatus may perform pooling on the target data. A size of the target data may be greater than a size of the pooled feature map. To determine the auxiliary loss, the training apparatus may perform pooling on the target data such that the size of the target data is the same as the size of the feature map output from each layer.

For example, the training apparatus may perform pooling on the target data with a distribution of probabilities of classes of the input data included in the target data. In a similar manner of performing pooling on the feature map, the training apparatus may perform pooling on the target data based on each class and determine a probability for each of the classes.

The auxiliary loss may be calculated based on a distance between the distribution of probabilities of the classes of the input data included in the target data and the distribution of probabilities of the classes of the feature map. In an example, Kullback-Leibler divergence, mean square error (MSE), and the like may be used to calculate the distance between the distribution of the probabilities of the classes of the input data and the distribution of the probabilities of classes of the feature map. However, a method of calculating the distance between the distribution of the probabilities of the classes of the input data and the distribution of the classes of the feature map may not be limited to the foregoing examples.

For example, for a region of the input data, values of elements of each class of the pooled feature map may be indicated by a class probability distribution. A processor may determine the auxiliary loss by calculating the probability distribution for the classes included in the target data at the same region and calculating the distance.

In operation 404, the training apparatus may train the neural network model based on the loss. The loss may include a loss determined based on the difference between the output data and the target data and the auxiliary loss determined based on the difference between the output data and the target data. A processor of the training apparatus may update a parameter of the neural network model to minimize the loss.

Figures 5A, 5B, 5C:
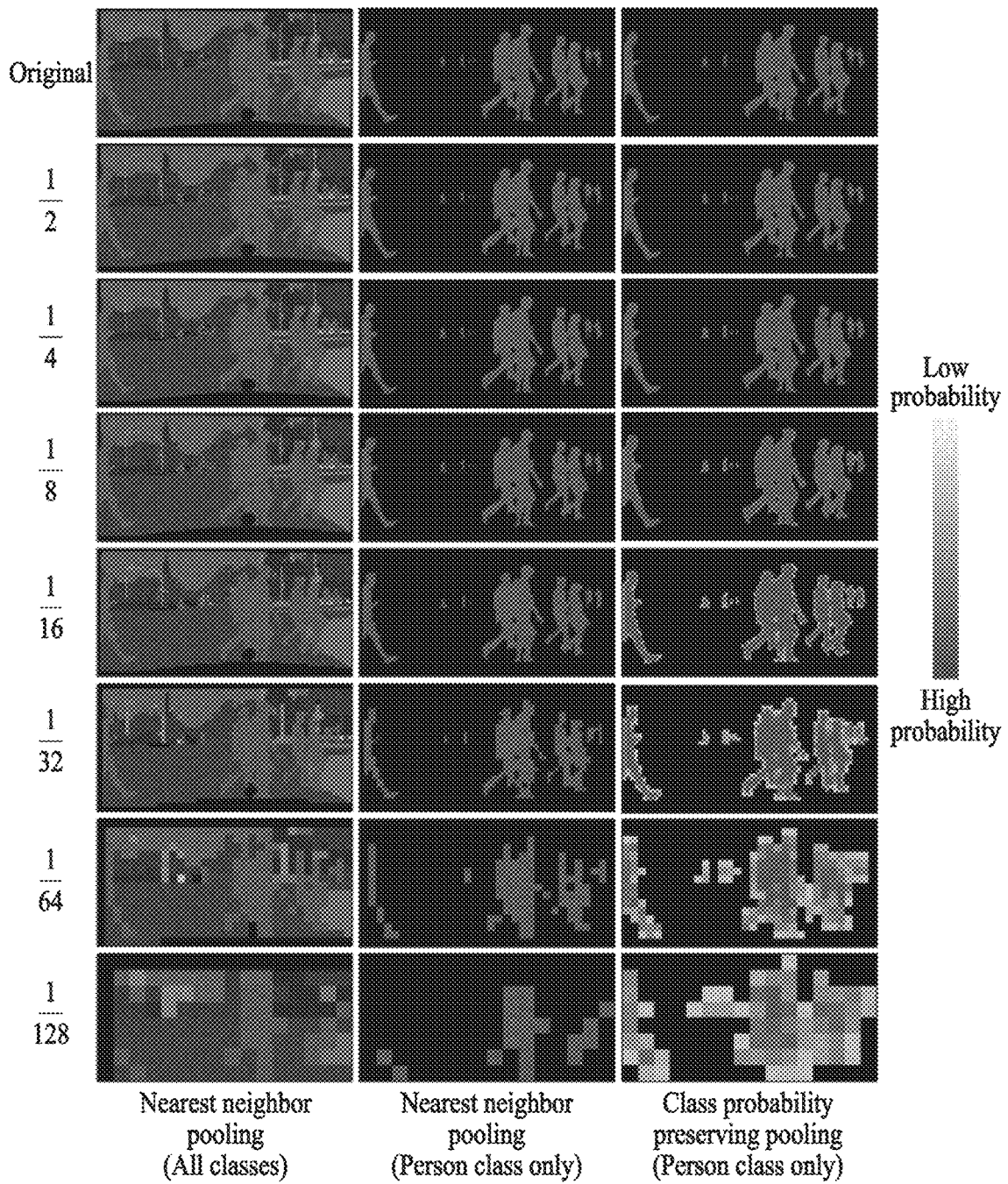
FIGS. 5A-5C illustrate examples of results obtained by performing pooling.

FIGS. 5A-5C illustrate examples results obtained by performing pooling.

FIG. 5A illustrates images pooled based on a nearest neighbor pooling technique for all classes by each scale factor. FIG. 5B illustrates images pooled based on the nearest neighbor pooling technique for a class corresponding to a human being by each scale factor. FIG. 5C illustrates images pooled based on the pooling technique described herein for a class corresponding to a human being by each scale factor.

Referring to FIG. 5B, as a scale factor increases, a loss of information associated with a boundary between a human being and an object may increase. However, referring to FIG. 5C, even when the scale factor increases, the information associated with the boundary between an object and a human being is maintained according to examples described herein. Thus, the pooling described above prevents a loss of information in determining a representative value when downsampling a feature map.

FIGS. 6A through 6D illustrate examples of structures of a neural network model. Example neural network models illustrated in FIGS. 6A through 6D may be of the same structure, having different number of times of performance of pooling and different positions on which the pooling is performed. Each of the neural network models illustrated in FIGS. 6A through 6D may include groups (e.g., groups 1 through 4) including a plurality of convolutional layers, and a stem indicating an input layer. In FIGS. 6A through 6D, an auxiliary head 601-604 may be used to determine auxiliary loss based on calculating a loss for feature outputs from one or more intermediate neural network layers. In FIGS. 6A through 6D, H, W, and C may refer to height, width, and channel of the feature map, respectively.

Figure 6A:
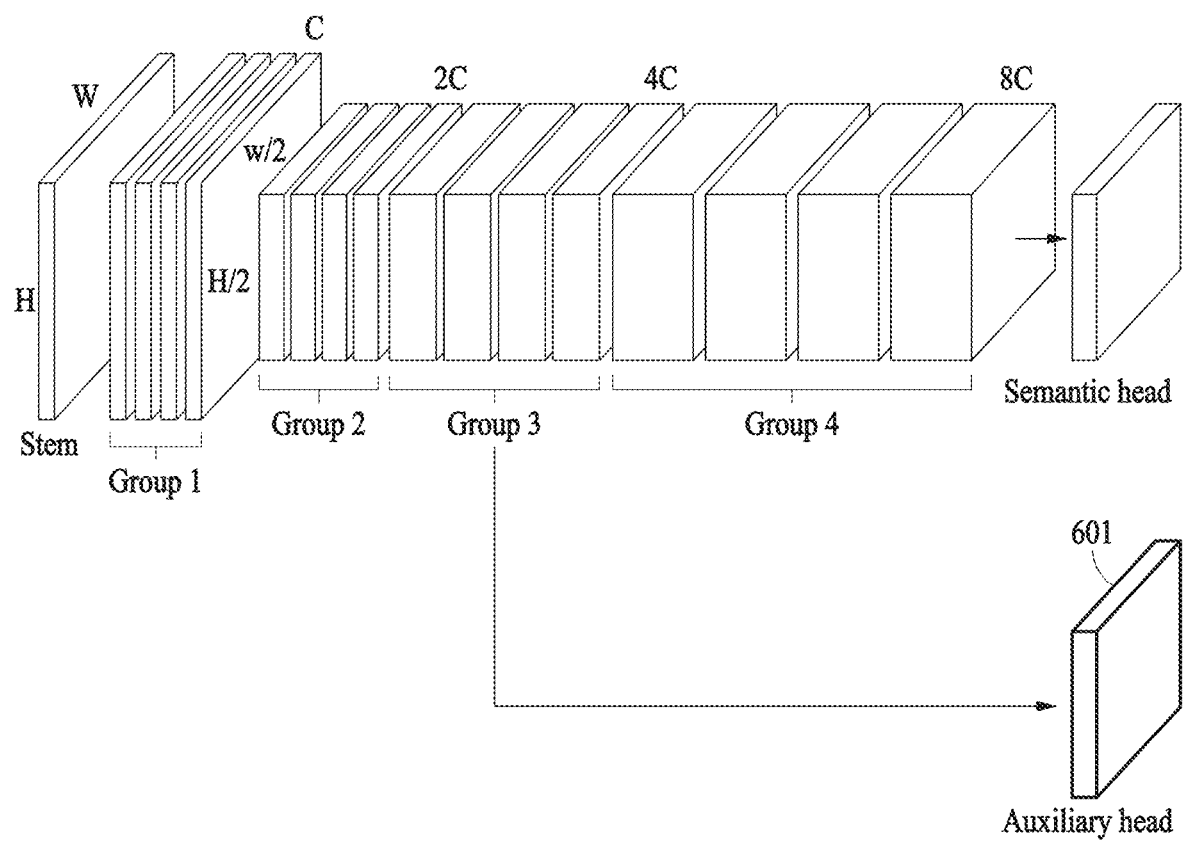
FIGS. 6A through 6D illustrate examples of structures of a neural network model.
Figure 6B:
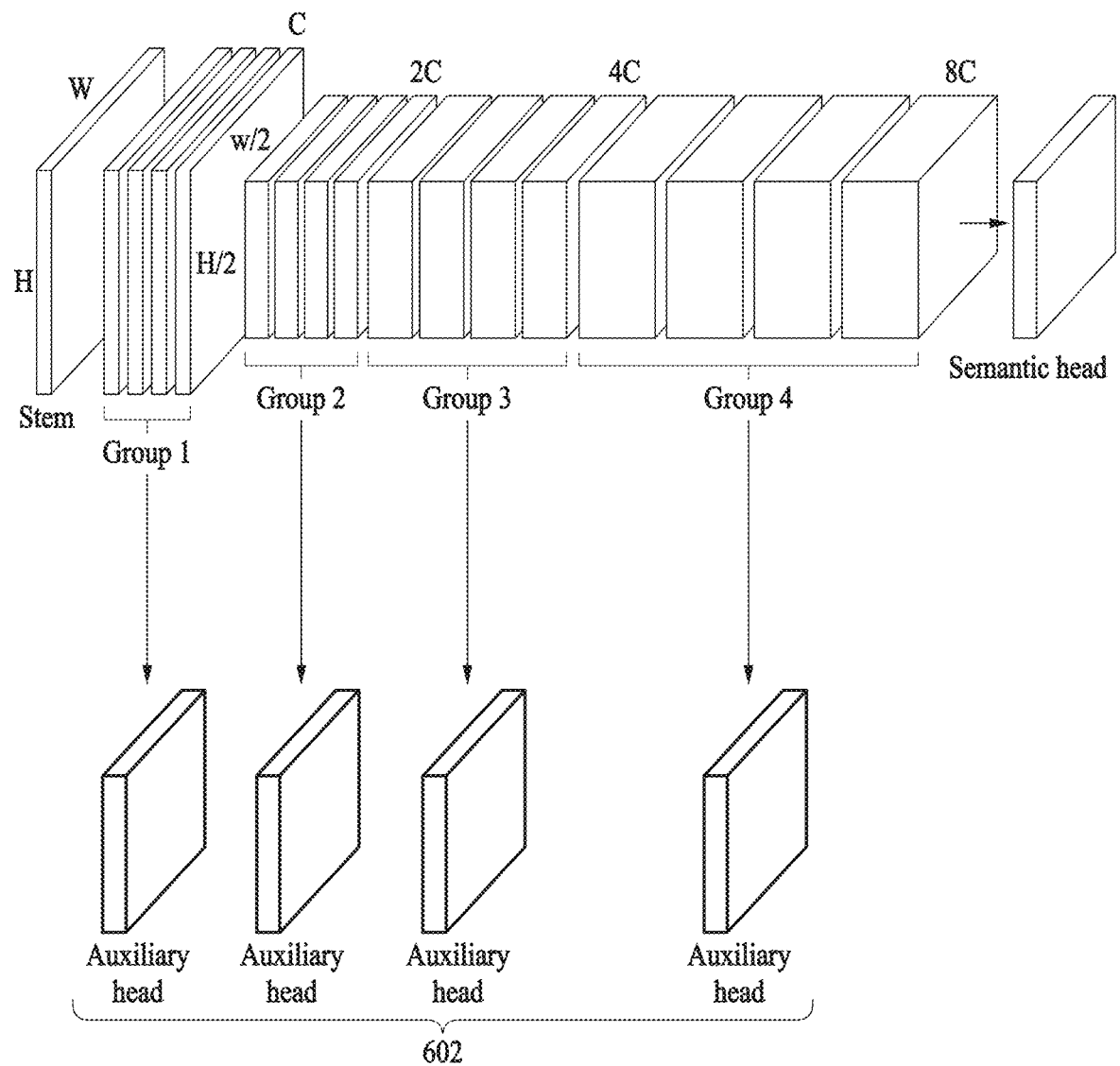
Figure 6C:
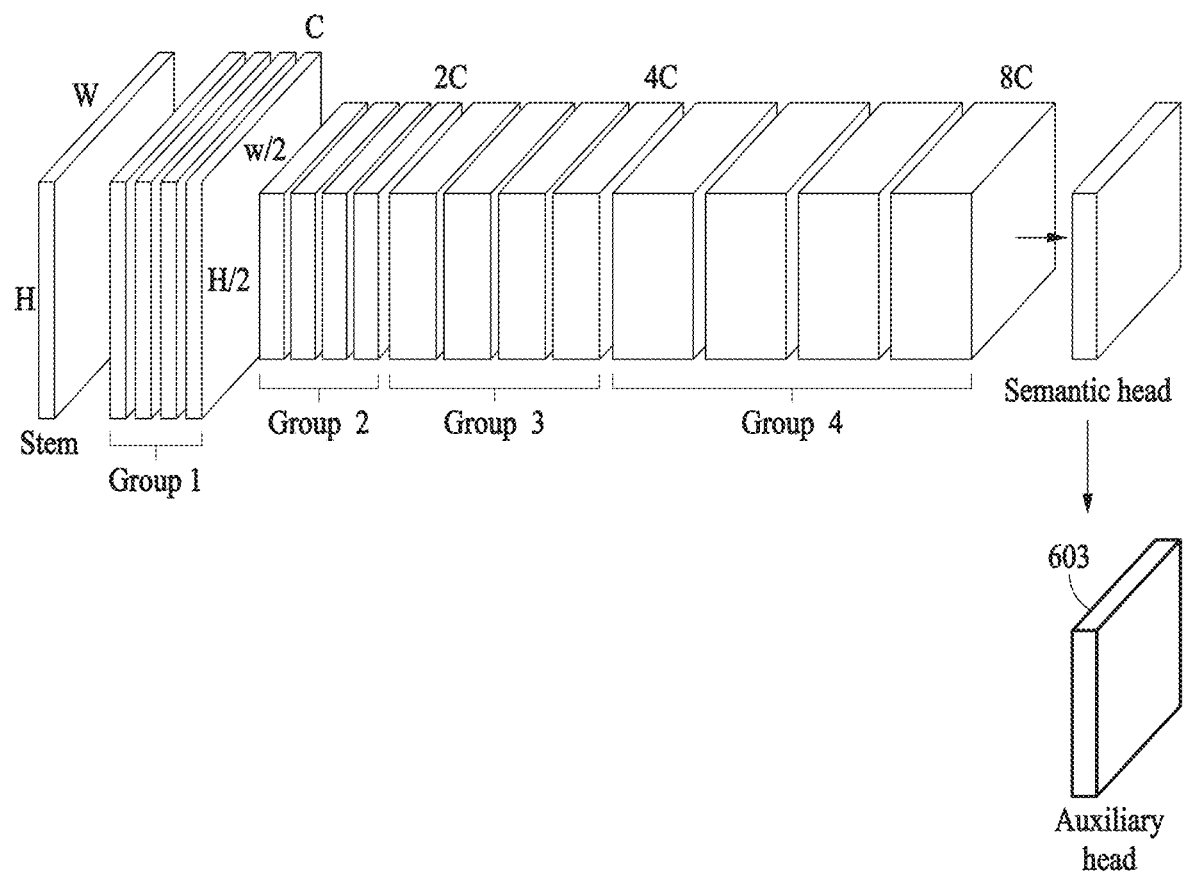
Figure 6D:
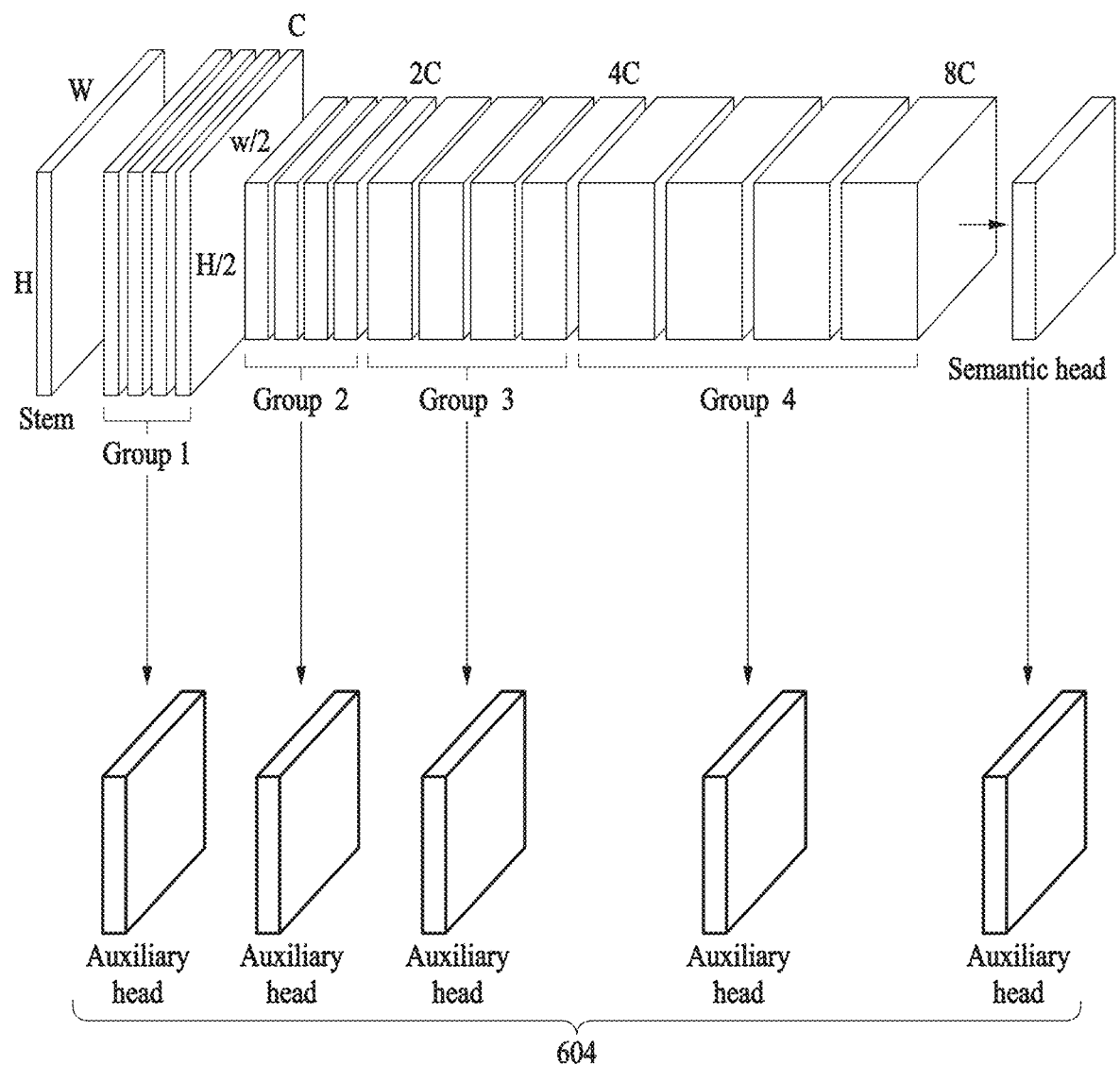

Referring to FIG. 6A, pooling described herein may be performed on a feature map on which an operation of group 3 is performed through an auxiliary head 601, and an auxiliary loss may be determined. In FIG. 6B, the pooling may be performed on feature maps on which operations of groups 1 through 4 are performed through auxiliary heads 602, and an auxiliary loss may be determined. In FIG. 6C, the pooling may be performed on a feature map on which an operation of a semantic head is performed through an auxiliary head 603, and an auxiliary loss may be determined. In FIG. 6D, the pooling may be performed on feature maps on which operations of groups 1 through 4 are performed through auxiliary heads 604, and an auxiliary loss may be determined.

The training apparatus, and other apparatuses, devices, units, modules, and components described herein with respect to FIGS. 1 and 4 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. In an example, the instructions or software includes at least one of an applet, a dynamic link library (DLL), middleware, firmware, a device driver, an application program storing the method of training a neural network model. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of training a neural network model, the method comprising:
   receiving input data and target data;
   pooling, by a neural network model, on each of plural classes represented in a feature map, extracted from the input data, based on respective probabilities for each of the plural classes represented in the feature map;
   generating output data by inputting the input data to the neural network model;
   determining a first loss based on a comparing of the output data and the target data, and an auxiliary loss based on a result of the pooling; and
   training the neural network model based on the first loss and the auxillary loss.

2. The method of claim 1, wherein the auxiliary loss is determined based on a difference between the target data and the result of the pooling.

3. A processor-implemented method of training a neural network model, the method comprising:
   receiving input data and target data;
   pooling, by a neural network model, on a feature map extracted from the input data based on a probability for each of classes of the feature map;
   generating output data by inputting the input data to a neural network model;
   determining a first loss based on comparing the output data and the target data, and based on an auxiliary loss of the pooling; and
   training the neural network model based on the first loss, wherein the neural network model is configured to determine the probability for each of the classes based on a ratio of elements belonging to a class of the classes to elements comprised in a unit region of the feature map determined by a scale factor of the pooling.

4. The method of claim 1, wherein the input data comprises an image comprising objects, and pixels comprised in the image are classified into the plural classes corresponding to the objects.

5. The method of claim 1, wherein the target data comprises a distribution of probabilities of the plural classes of the input data,
   wherein the auxiliary loss is calculated based on a distance between a distribution of probabilities of the plural classes of the input data comprised in the target data and a distribution of the respective probabilities of the plural classes represented in the feature map.

6. A non-transitory computer-readable storage medium storing instructions that, when executed by a processor, cause the processor to perform the method of claim 1.

7. The method of claim 1, further comprising determining a ratio of elements belonging to a class to all elements in a unit region of the feature map to determine the respective probabilities.

8. An apparatus for training a neural network model, the apparatus comprising:
   a processor configured to:
      receive input data and target data;
      perform a pooling, by a neural network model, on each of plural classes represented in a feature map, extracted from the input data, based on respective probabilities for each of the plural classes represented in the feature map;
      generate output data by inputting the input data to the neural network model;

determine a first loss based on a comparison of the output data and the target data, and an auxiliary loss based on a result of the pooling; and train the neural network model based on the first loss and the auxillary loss.

9. The apparatus of claim 8, wherein the auxiliary loss is determined based on a difference between the target data and the result of the pooling.

10. The apparatus of claim 8, wherein the neural network model is configured to determine the respective probabilities for each of the plural classes based on a ratio of elements belonging to a class of the plural to elements comprised in a unit region of the feature map determined by a scale factor of the pooling.

11. The apparatus of claim 8, wherein the input data comprises an image comprising objects, and pixels comprised in the image are classified into the plural classes corresponding to the objects.

12. The apparatus of claim 8, wherein the target data comprises a distribution of probabilities of the plural classes of the input data, wherein the auxiliary loss is calculated based on a distance between a distribution of probabilities of the plural classes of the input data comprised in the target data and a distribution of the respective probabilities of the plural classes represented in the feature map.

13. A processor-implemented method of training a neural network model, the method comprising:

receiving input data and target data;

extracting a feature map from the input data;

performing pooling on the feature map based on a scale factor and respective probabilities of plural classes of objects represented in the feature map;

generating output data by inputting the input data to a neural network model;

determining a first loss based on a comparing of the output data and the target data, and an auxiliary loss based on a result of the pooling; and training the neural network model based on the first loss and the auxillary loss.

14. The method of claim 13, further comprising determining a ratio of elements belonging to the class to all elements in a unit region of the feature map to determine the respective probabilities.

15. The method of claim 13, wherein:

the target data comprises a distribution of probabilities of each of the plural classes being present in each unit region of the input data; and the auxiliary loss is calculated based on a distance between a distribution of the respective probabilities of the plural classes represented in the feature map and a distribution of probabilities of the plural classes of a corresponding region of the input data in the target data.

16. The method of claim 15, wherein:

the target data comprises a ground truth label; and the determining of the first loss comprises determining the first loss by comparing the output data and the ground truth label.

17. The method of claim 15, further comprising:

performing pooling on the target data to make a size of the target data equal to a size of the feature map; and calculating the auxiliary loss based on a distance between the distribution of the respective probabilities of the plural classes represented in the feature map and a distribution of probabilities of the plural classes of the pooled target data.

\* \* \* \* \*